Nov. 8, 1966     W. J. SCHEUTZOW     3,283,863
POWER TRANSMISSION SYSTEMS FOR ROTARY WING AIRCRAFT
Filed Sept. 8, 1964     2 Sheets-Sheet 1

INVENTOR.
WILBUR J. SCHEUTZOW
BY *Watts & Fisher*
ATTORNEYS

Nov. 8, 1966          W. J. SCHEUTZOW          3,283,863
POWER TRANSMISSION SYSTEMS FOR ROTARY WING AIRCRAFT
Filed Sept. 8, 1964                    2 Sheets-Sheet 2
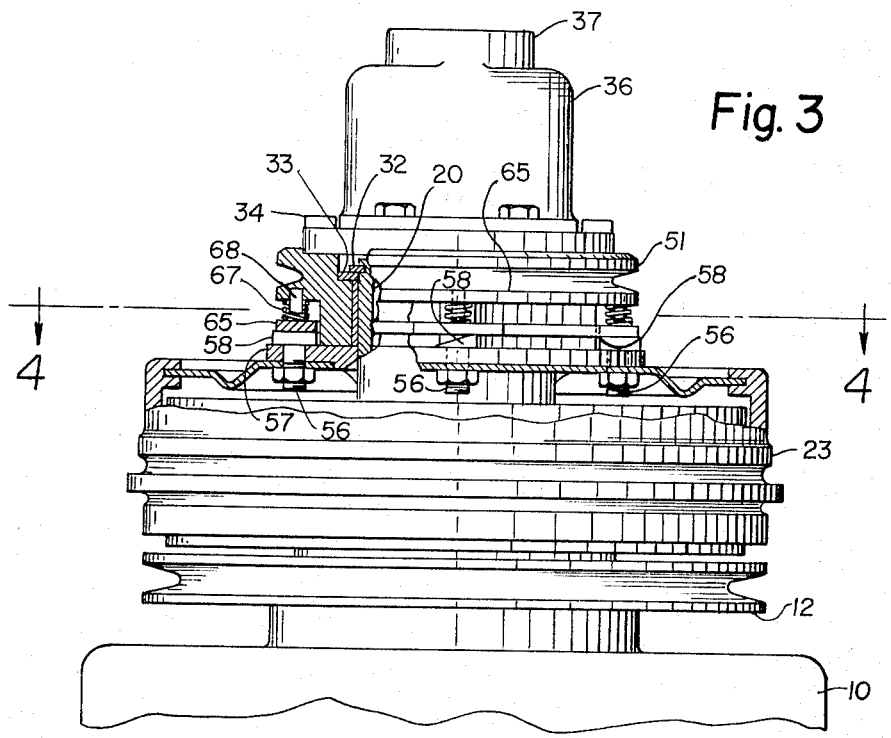
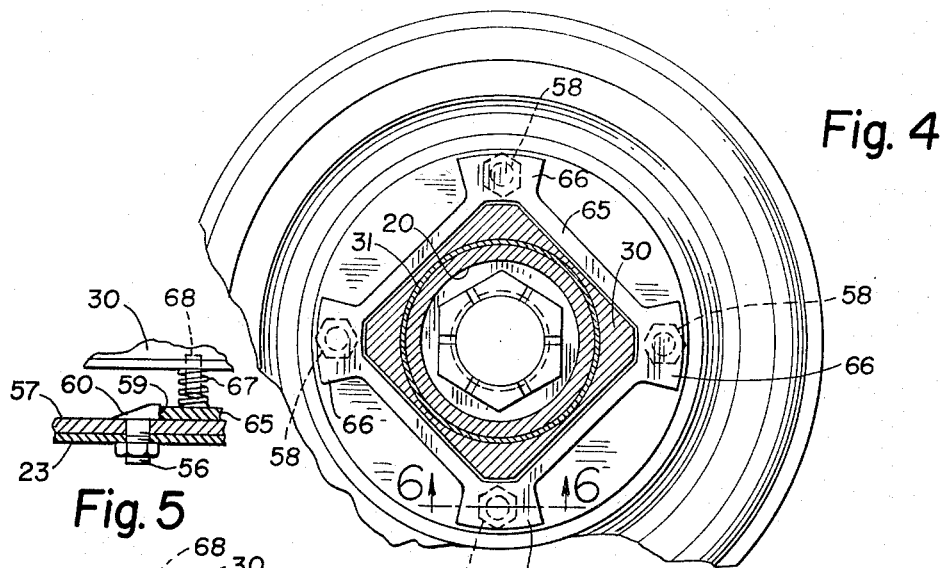
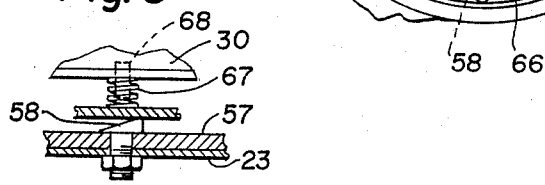
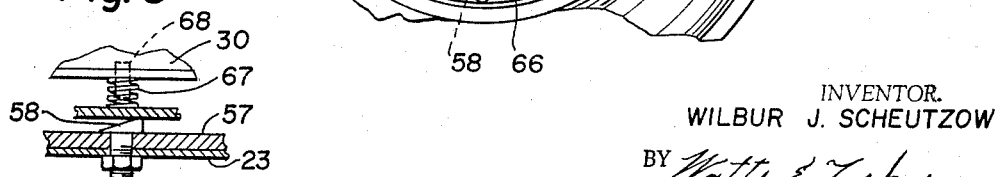
INVENTOR.
WILBUR J. SCHEUTZOW
BY Watts & Fisher
ATTORNEYS

United States Patent Office 3,283,863
Patented Nov. 8, 1966

3,283,863
POWER TRANSMISSION SYSTEMS FOR ROTARY WING AIRCRAFT
Wilbur J. Scheutzow, Berea, Ohio, assignor to Scheutzow Helicopter Corporation
Filed Sept. 8, 1964, Ser. No. 394,707
8 Claims. (Cl. 192—46)

This invention relates generally to power transmission systems for rotary wing aircraft, and more specifically to a new and improved one-way overrunning clutch mechanism which is particularly adapted to be employed in the drive between the engine and rotor of a helicopter or the like.

Power transmissions of helicopters are unusual in that the rotor system results in high loads being imposed on the drive clutch mechanism. One of the primary problems in the art prior to the present invention has been to provide a reliable overrunning clutch which will withstand the high operating loads. Another problem has been to provide a clutch mechanism which, in the event of engine or transmission failure, will not lock the rotor drive shaft to the engine, but will instead permit autorotation and safe descent of the helicopter. Still other problems have been to provide a clutch which is characterized by long life and good wearing properties.

Others in the art have attempted to provide a clutch satisfying the foregoing criteria; however, most of the conventional constructions have not been wholly satisfactory in use. Moreover, the prior clutch mechanisms have been relatively expensive.

A conventional and well-known clutch mechanism which has been used in the power transmissions of helicopters is the so-called sprag clutch construction. One serious problem encountered with the sprag clutch was that the sprag elements could tilt in the wrong direction due to the high loads which were imposed. This caused the rotor shaft to be locked to the drive shaft, thereby preventing autorotation of the rotor. Sprag clutch constructions are also expensive because of the inherent precision requirements and associated bearing structure.

Attempts have also been made to use jaw clutch constructions. These constructions were subject to the objection that only some of the teeth would engage, it being difficult to manufacture the clutches with the high precision necessary to assure full engagement. Consequently, jaw clutches were characterized by relatively poor wearing properties and a relatively short life. Jaw clutches also were expensive because of the many teeth and complex angles inherent in their construction.

The present invention overcomes the foregoing problems and provides a new and improved clutch construction which offers many advantages, particularly when employed in the power transmission of a helicopter. In accordance with this invention, there is provided a new and improved over-running clutch which will withstand the loads occurring in a helicopter power transmission and which has a construction such that it will not fail so as to lock the rotor shaft and thereby prevent autorotation. The new one-way overrunning clutch is further characterized by a relatively simple inexpensive construction as compared to prior art clutches and by long life and good wearing properties.

More particularly, the preferred and illustrated embodiment of the invention contemplates a construction including spaced drive elements which are secured to a shaft driven by the engine. A floating frame member which includes pawls engageable with the drive elements is loosely mounted around a driven shaft connected to the rotor. The floating frame is axially movable on the driven shaft and is pressed by springs into abutting engagement with the drive elements so as to provide power transmission to the rotor when the engine is driving the rotor. During autorotation when the driven shaft r.p.m. exceeds that of the drive shaft, the frame member overruns the drive elements by moving on the driven shaft against the force of the springs. In the event that one or more of the drive elements or the frame itself should fail, the clutch will still permit free-wheeling of the rotor.

An important feature of the invention which results in a high order of reliability is the effective connection of a plurality of pawls to form a single frame member. This construction is such that the pawls function as a single active member rather than as individual members during overrunning and/or reengaging of the clutch. The phasing of the several pawls so as to act as a single active member is highly advantageous as compared to conventional constructions employing individually acting pawls. With such prior art constructions, one pawl can be engaged while other pawls are disengaged, thereby placing the entire drive load on a single pawl which may result in early mechanical failure of the clutch. In the clutch of this invention, all of the pawls move and engage together so that the driving load is properly distributed on the several pawls.

The reliability of the clutch comprising this invention is further enhanced because of an arrangement which results in low unit stresses during normal operation. The working elements of the clutch are loaded principally in compression. The invention makes it possible to provide working surfaces which are of adequate area so that the compressive stresses during operation are of low value.

Another feature of the invention resides in the simplicity of the clutch construction and its inherent low cost of manufacture. In particular, the invention provides a reliable and yet low cost clutch in which precision parts, such as anti-friction bearings, precision ground races or other difficult to machine parts often necessary in roller, jaw, and sprag type clutches, are eliminated.

A further feature of the invention is the provision of a clutch construction which is of light weight by reason of its simplicity.

Still another feature of the invention is the provision of a clutch which requires little or no maintenance and lubrication.

Other features, advantages and a fuller understanding of the invention will be had by reference to the following detailed description and the accompanying drawings.

In the drawings:

FIGURE 3 is a side elevational view partially in cross-section of the power transmission;

FIGURE 4 is a cross-sectional view taken on the line 4—4 of FIG. 3;

FIGURE 5 is a cross-sectional view taken on the line 5—5 of FIG. 2 and shows the clutch in an engaged position; and FIGURE 6 is a cross-sectional view taken on the line 6—6 of FIG. 4 and shows the clutch in an overrunning position.

Figure 1:
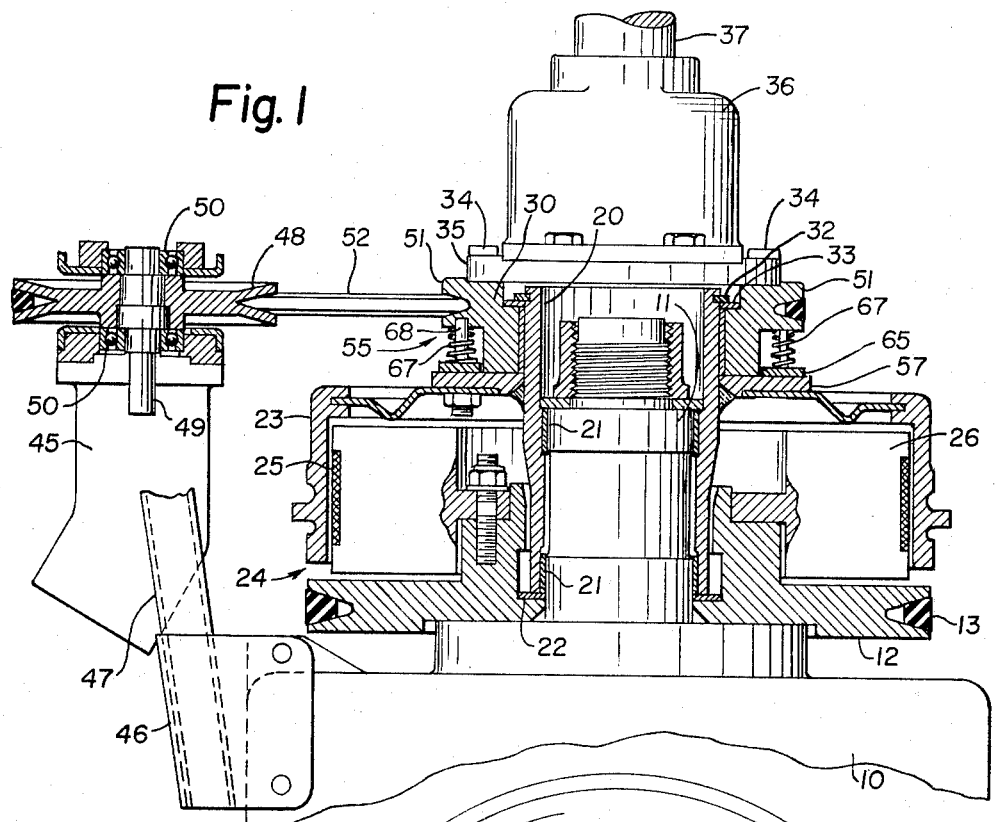
FIGURE 1 is a vertical cross-section view of a helicopter power transmission embodying the clutch of this invention.
Figure 2:
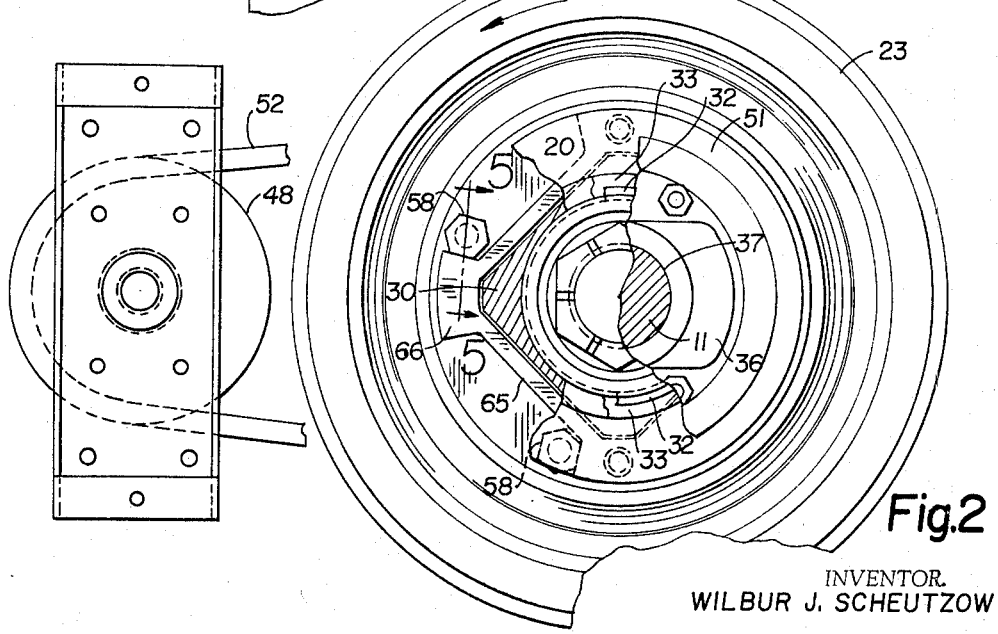
FIGURE 2 is a top plan view with portions broken away of the apparatus shown in FIG. 1.

Referring now to drawings, and to FIGS. 1 and 2 in particular, there is shown an engine 10 which may be suitably connected to the fuselage of a helicopter. The drive shaft of the engine 10 is indicated by reference numeral 11 and to this shaft is keyed a pulley 12. The pulley 12 may be connected to the engine cooling fan (not shown) by a pulley belt 13.

A hollow drive shaft 20 is journalled around the engine shaft 11 by sleeve bushings 21 and a washer 22 is provided between the pulley 12 and the lower end of the shaft 20. The drive shaft 20 carries a drum 23 which forms part of a conventional mercury clutch 24. The drive shoe 25 of the clutch 24 forms part of the actuating member 26 which is bolted to the pulley 12 within the drum 23. As will be understood by those familiar with the art, the mercury clutch 24 is actuated at a predetermined engine r.p.m., as for example 500 to 600 r.p.m., to engage the drive shoe 25 with the inside of the drum 23. In this manner, the engine is operatively connected to the drive shaft 20 which is in turn connected to the rotor shaft as will hereinafter be described in greater detail. Other clutches, including centrifugal clutches, disc clutches, fluid clutches and the like, can be substituted for the described clutch 24 without departing from the invention.

A hollow driven shaft 30 which may be of square cross-sectional configuration is journaled around the upper end of the drive shaft 20 by a sleeve bushing 31. The shaft 30 is shown to be held in place by a snap ring 32 which is carried by the shaft 20 and engages a washer 33 on the shaft 30. The shaft 30 is connected by bolts 34 to a plate 35, and this plate 35 is connected by a universal 36 to a shaft 37. The shaft 37 may be connected by any suitable means to the rotor (not shown) of the helicopter.

An oil pump 45, which may be used for driving the tail rotor (not shown), is mounted on the engine 10 by a bracket 46 and strut 47. A pulley 48 is connected to the pump shaft 49 which is mounted in bearings 50. The driven shaft 30 includes a pulley 51 which is connected to the pump pulley 48 by a V-belt 52.

It is to be understood that the foregoing drive is not limiting of this invention, and that it has been chosen for the purposes of clearly illustrating and describing to those in the art one particular drive in which the new clutch mechanism can be employed to advantage.

The one-way overrunning clutch 55 comprising this invention serves to connect the drive shaft 20 to the driven shaft 30. In accordance with the preferred embodiment of the invention, the clutch 55 comprises four circumferentially spaced drive elements 56 which are fixed to an annular plate 57 at equally spaced locations around the driven shaft 30. The annular plate 57 is secured to the clutch drum 23 and is welded to the drive shaft 20.

As shown most clearly in FIGS. 5 and 6, the drive elements 56 may be simply constructed in the form of bolts which have wedge-shaped heads 58 disposed above the plate 57. The wedge-shaped heads 58 of the drive elements include driving shoulders 59 which are oriented in the direction of rotation of the drive shaft 20. Each of the drive element heads 58 has an upper surface 60 which slopes away from the shoulder 59 to the plate 57.

The active or transmission member of the clutch 55 comprises a frame 65 which floats on the driven shaft 30 over the plate 57. The transmission member or frame 65 is vertically movable on the shaft 30 and is internally configured to engage the shaft so that the frame and shaft will rotate together.

The frame 65 includes a plurality of pawls 66 corresponding in number to the drive elements 56. When the frame 65 is against the plate 57, the driving shoulders 59 of the elements 56 are each engageable with a pawl 66 (FIG. 5) so as to cause rotation of the frame and driven shaft. The frame 65 is resiliently urged toward the plate 57 to affect engagement of the clutch by springs 67. In the construction shown, the springs 67 bear on the upper surfaces of the pawls 66 and against the portion 51 of the shaft 30 which extends over the plate 57. The springs 67 are maintained in these locations by pins 68 which depend from the shaft 30.

In the preferred construction, the frame 65 is loosely fitted on the shaft 30 to provide a clearance on the order of .005 of an inch. With this preferred construction the frame 65 is free to rotate on the shaft 30 through a small angular displacement as the clutch is engaged. For reasons more fully described below, this limited angular rotation of the frame 65 when engagement takes place makes it unnecessary to provide absolute precision in the spaced relationship of the pawls 66 to the driving shoulders 59 on the drive elements 56.

The operation of the power transmission will be largely apparent from the foregoing description. In summary, the clutch 24 will be actuated at a predetermined engine r.p.m. Action of the clutch 24 serves to rotate the drive shaft 20 which carries the clutch drive elements 56. The shoulders 59 of these elements engage the pawls 66 to affect rotation of the frame 65 and the driven shaft 30. Rotation of the shaft 30 is transmitted through the universal 36 to the shaft 37 which is suitably connected to the rotor of the helicopter.

As described above, when the drive elements 56 are rotated into engagement with the pawls 66, the frame 65 is free to move through a limited angular distance on the shaft 30. This slight movement of the frame assures that all of the drive elements will be brought into engagement with the pawls, whereby the load on the frame is equalized. Consequently, the frame is prevented from being damaged and will not bind on the shaft 30. Another advantage of making the frame 65 free to float on the drive shaft is that optimum driving engagement of all of the elements 56 and pawls 66 is obtained without requiring the clutch to be manufactured with the precision necessary in conventional clutch constructions.

The clutch 55 advantageously permits overrunning of the shaft 30 with respect to the drive shaft 20, as would occur in the event of engine failure. Referring particularly to FIGS. 4 and 6, it will be seen that in an overrunning condition the frame pawls 66 will ride up the sloping surfaces 60 of the drive elements 56 and the frame 65 will be raised from the plate 57 against the biasing force of the springs 67. As the pawls pass over the drive elements, the springs will again press the frame 65 against the plate 57. Thus, the frame is free to ratchet over the drive elements to permit overrunning of the shaft 30 and auto-rotation.

As generally described above, an important feature of the invention is that the clutch will not lock the shaft 30 in the event of clutch failure. To this end the floating frame 65 is loosely mounted so that it will not cock and bind on the shaft 30. Further, even though the frame or one or more of the drive elements should become damaged, the frame will still be able to ratchet in a free-wheeling state to permit overrunning of the shaft 30.

It will also to be seen that the drive elements 56 and the pawls 66 can be constructed of such a size that low compressive forces are experienced by clutch elements during normal operation. Thus, the invention obtains the advantages of a simple, low-cost, and yet highly reliable clutch construction. The clutch is of particular utility in the production of a low-cost helicopter, since it is only by replacement of the conventional expensive clutches with a reliable and simplified construction that a low cost of a helicopter can be attained.

Many modifications and variations of the invention will be apparent to those skilled in the art in view of the foregoing detailed description. Therefore, it is to be understood that, within the scope of the appended claims, the invention can be practiced otherwise than as specifically shown and described.

What is claimed is:
1. In a helicopter or the like, the combination comprising:
(a) a rotary drive shaft,
(b) a rotary driven shaft,
(c) a plurality of spaced wedges carried around one of said shafts for rotation therewith, each of said wedges including a sloping surface terminating at a shoulder,
(d) a unitary, flat, thin transmission member mounted around the other of said shafts for movement toward and away from said wedges, said transmission member having opposed, parallel, closely spaced planer faces transverse to said other shaft and including circumferentially spaced, rigid arms which project radially from said other shaft and lie between the planes established by said opposed faces, said member and said other shaft being formed with cooperating surfaces so that the said member and said other shaft are rotatable together, (e) spring means resiliently urging said unitary member toward said wedges so that said shoulders and the sides of said arms are in cooperative abutting engagement to transmit rotary motion between said shafts, said shoulder having a height at least equal to the thickness of said member and extending between the planes established by said opposed faces, (f) said spring means permitting said member to move away from said wedges so that said member can ride over said sloping surfaces when said driven shaft overruns said drive shaft, (g) an engine operatively connected to said drive shaft, and (h) structure adapted to connect said driven shaft to a rotor of a helicopter.

2. The combination as claimed in claim 1 wherein said transmission member is loosely fitted on said other shaft with a radial clearance therebetween so that said member can freely move a limited distance both angularly and transversely relative to said other shaft.

3. In a helicopter or the like, the combination comprising:

(a) rotary drive shaft means, said drive shaft means including a circumferential, laterally extending surface, (b) a plurality of circumferentially spaced wedges projecting from said laterally extending surface, each of said wedges including a sloping surface terminating at a driving shoulder, said shoulders being oriented in the direction of rotation of said drive shaft means, (c) a rotary driven shaft, (d) a transmission member defined by a flat, thin floating frame loosely fitted on said driven shaft and rotatable therewith, said frame being movable longitudinally and through a limited distance with respect to said driven shaft, said frame having opposed, parallel, closely spaced planer faces transverse to said driven shaft and including circumferentially spaced portions which lie between the planes established by said opposed faces, (e) spring means urging said frame against said laterally extending surface so that said wedges are between said frame portions and said shoulders are engageable with the sides of said frame portions to cause rotation of said driven shaft, (f) said spring means permitting said frame portions to ratchet over said sloping surfaces when said driven shaft overruns said drive shaft means, and (g) structure adapted to connect said driven shaft to a rotor of a helicopter.

4. A transmission comprising:

(a) a rotary drive shaft, (b) said drive shaft including structure defining a circumferential, laterally extending surface, (c) a plurality of circumferentially spaced drive elements secured to said laterally extending surface, (d) each of said drive elements including a wedge-shaped head having a sloping surface terminating at a driving shoulder, said shoulders being oriented in the direction of rotation of said drive shaft, (e) a driven shaft having a polygonal cross-sectional configuration, (f) a transmission member defined by a unitary, flat, thin floating frame loosely fitted on said driven shaft, said frame including an endless portion internally configured to engage and rotate with said driven shaft and spaced peripheral arms projecting from said endless portion, said frame being movable longitudinally and through a limited distance both angularly and laterally with respect to said driven shaft, said frame having opposed, parallel, closely spaced planer spaces transverse to said driven shaft, said arms lying between the planes established by said opposed faces, and (g) spring means urging said frame into a position where the sides of said frame arms are engaged by said driving shoulders to transmit loads in a plane transverse to the axis of said driven shaft and cause rotation thereof, (h) said spring means permitting said frame to ratchet over said sloping surfaces when said driven shaft overruns said drive shaft.

5. A transmission comprising:

(a) rotary drive structure;

(b) rotary driven structure;

(c) one of said structures including:
 (i) a shaft portion,
 (ii) a flat, thin, unitary frame surrounding said shaft portion and rotatable therewith,
 (iii) said frame having opposed, parallel, closely spaced planer faces transverse to said shaft portion and rigid, circumferentially spaced, radially projecting arms which lie between the planes established by said opposed faces,
 (iv) said frame being movable axially of said shaft portion,
 (v) and means urging said frame axially of said shaft portion into a position of operative engagement with the other of said structures; and (d) said other structure including a plurality of portions each abuttable against a side of a different one of said arms during relative rotation of said structure in one direction;

(e) said arms and said abuttable portions having engaging surfaces which lie between the planes established by said opposed faces and extend outwardly of the axis of said shaft portion to transmit loads in a plane transverse to said axis so that said frame is loaded in compression.

6. The transmission as claimed in claim 5 wherein said frame has a radial clearance with respect to said shaft portion and is free to move through a limited distance both angularly and transversely of said shaft portions so as to assure positive engagement between said arms and said abuttable portions.

7. The transmission as claimed in claim 6 wherein:

(f) said urging means acting on said frame comprises yieldable biasing means; and (g) said abuttable portions are formed to include sloping surfaces terminating at the arm-engaging surfaces thereof;

(h) said frame being free to move against said biasing means and ratchet over said sloping surfaces during relative rotation of said structures in a direction opposite to said one direction.

8. A transmission comprising in combination:

(a) rotary drive structure to which power is applied;

(b) rotary driven structure;

(c) a clutch for operatively connecting said structures in driving relation while permitting said driven structure to overrun said drive structure, said clutch including:
 (i) a plurality of flat, thin pawl arms projecting radially from the axis of rotation of one of said structures and lying between closely spaced planes extending transverse to said axis,
 (ii) said arms being angularly spaced from each other about said axis and operatively connected together to function as a single means, (iii) means which forms a part of the other structure and provides a plurality of angularly spaced abutments normally disposed between said arms, (iv) said abutments and the sides of said arms being engageable in one direction of relative rotation so that driving loads are transmitted in a plane which include said abutments and arms and is transverse to said axis of rotation;

(v) one of said means being resiliently urged toward the other of said means to place said abutments between said arms, and (vi) said abutments and said arms being formed to permit said means to overrun each other in a direction of relative rotation opposite to said one direction.

References Cited by the Examiner

UNITED STATES PATENTS

| | | | |
|---|---|---|---|
| 832,222 | 10/1906 | Tuttle | 192—46 |
| 1,490,505 | 4/1924 | Breese | 192—42 |
| 1,574,462 | 2/1926 | Wintroath | 192—46 |
| 1,989,404 | 1/1935 | Dickieson | 192—103 |
| 3,187,870 | 6/1965 | Sabatini | 192—46 |

FOREIGN PATENTS

| | | |
|---|---|---|
| 416,556 | 9/1934 | Great Britain. |
| 601,939 | 8/1934 | Germany. |

DAVID J. WILLIAMOWSKY, *Primary Examiner.*

UNITED STATES PATENT OFFICE
CERTIFICATE OF CORRECTION

Patent No. 3,283,863                     November 8, 1966

Wilbur J. Scheutzow

It is hereby certified that error appears in the above numbered patent requiring correction and that the said Letters Patent should read as corrected below.

Column 5, line 4, after "distance" insert -- angularly and laterally --; line 73, for "havin ga" read -- having a --; column 6, line 40, for "structure" read -- structures --.

Signed and sealed this 12th day of September 1967.

(SEAL)
Attest:

ERNEST W. SWIDER
Attesting Officer

EDWARD J. BRENNER
Commissioner of Patents